June 28, 1938. J. M. PESTARINI 2,122,237
ELECTRICAL MACHINE, OF THE KIND CALLED METADYNE,
OPERATING AT AN ADJUSTABLE CONSTANT SPEED
Filed Sept. 15, 1934
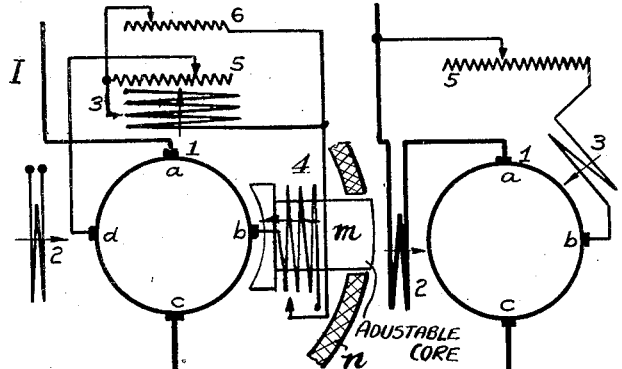
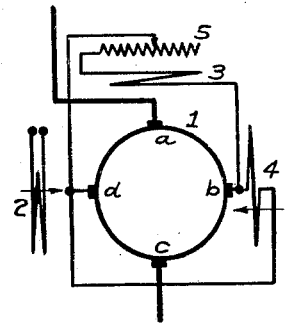
Fig. 1    Fig. 2    Fig. 3
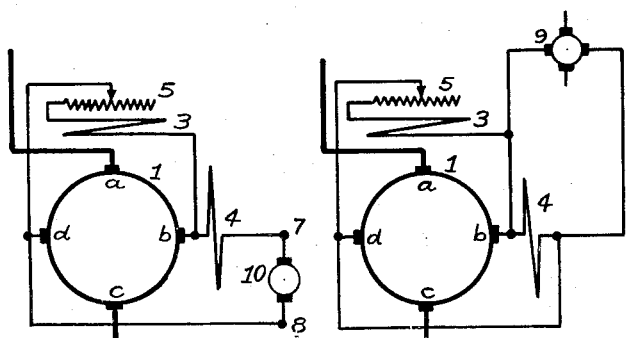
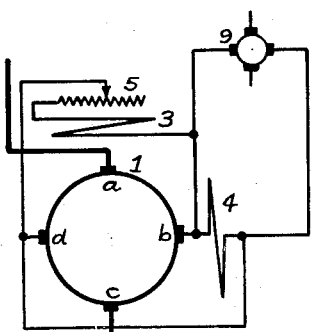
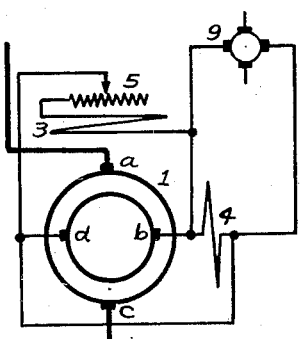
Fig. 4    Fig. 5    Fig. 6
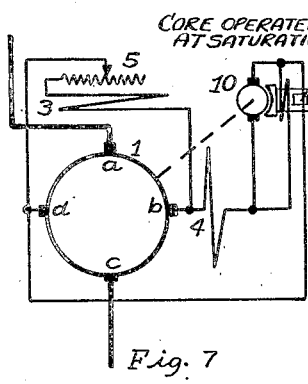
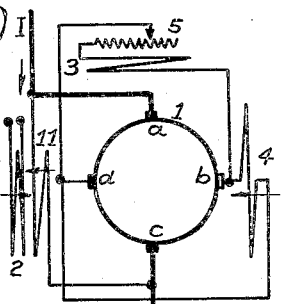
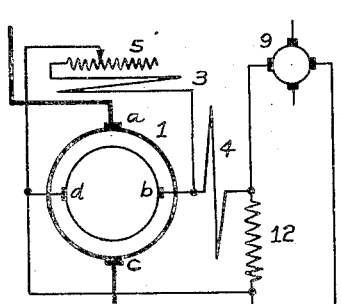
Fig. 7    Fig. 8    Fig. 9
Inventor:-
Joseph Maximus Pestarini Patented June 28, 1938

2,122,237

UNITED STATES PATENT OFFICE

2,122,237

ELECTRICAL MACHINE, OF THE KIND CALLED METADYNE, OPERATING AT AN ADJUSTABLE CONSTANT SPEED

Joseph Maximus Pestarini, Grant City, Staten Island, N. Y.

Application September 15, 1934, Serial No. 744,207
In France September 18, 1933

7 Claims. (Cl. 171—223)

This invention relates to electrical machines for direct current of the kind called metadyne. The metadyne is a rotating machine mentioned in many previous American patents; for instance in Patent No. 1,945,447; No. 1,962,030. The metadyne essentially consists of a rotor with winding and commutator as in dynamo machines; a stator is provided which mainly affords a return path of low magnetic reluctance for the fluxes created by the rotor currents. Generally the commutator carries two sets of brushes, the current traversing one set of brushes creating by its ampere turns a flux which induces an electromotive force between the brushes of the other set. One set of brushes, called primary set and traversed by a current called primary current, is generally connected to a supplying source of direct current; the other set of brushes, called secondary set and traversed by a current called secondary current, is generally connected to electrical consumers, motors or field windings, supplied with current by the metadyne. The stator of the metadyne may be provided with windings which endow the machine with the desired electro-mechanical characteristics.

A description in detail of the metadyne principles is given in a paper entitled "Esquisse sur la Metadyne" by J. M. Pestarini in the "Bulletin Scientifique A. I. M." No. 4, April, 1931 of "L'Association des Ingenieurs Electriciens" published by the "Institut Electrotechnique Monteflore", Liege, Belgium.

If a dynamo motor is inserted in a series network we shall have great difficulties in keeping it rotating at a constant speed, at a value adjustable at will. The same difficulty is encountered in a shunt or parallel network where the line voltage varies irregularly and shows a great discrepancy from its normal value.

The scheme disclosed by the present invention permits to obtain motors which rotate at a practically constant speed, the value of which may be adjusted at will, when the motor is inserted in a series network, or connected to the line of a parallel network the line voltage of which is very variable.

The invention consists essentially in arranging the stator windings of the metadyne in such a way as to make the machine develop automatically a large accelerating or braking torque when the speed shows a slight discrepancy from the desired value N of the speed, in such a direction as to maintain the speed very near to N under very wide load variations, the torque variations being created by quick current variations due to a sudden building up in the metadyne itself at the speed N. The sudden building up occurs at a speed which depends on the electrical and magnetic constants of the circuit where the building up occurs; therefore, we may adjust the speed N at the desired value by adjusting the electrical and magnetic constants accordingly.

In the accompanying drawing:

Fig. 1 shows a metadyne motor with four brushes and three stator windings, arranged according to the present invention.

Fig. 2 shows a metadyne motor with only three brushes.

Fig. 3 also shows a metadyne motor with four brushes but an arrangement of stator windings slightly different from the arrangement of Fig. 1.

Fig. 4 shows a metadyne motor with four brushes and a small auxiliary generator, which facilitates the modification of the speed.

Fig. 5 shows a metadyne motor with four brushes and a constant current source feeding the stator windings.

Figs. 6 and 9 show slightly different alternatives of the arrangement shown in Fig. 5, wherein the metadyne has two rotor windings instead of one, as shown in Fig. 5.

Fig. 7 is an alternative of the arrangement shown in Fig. 4, the small auxiliary dynamo being driven by the same shaft as the metadyne motor.

Fig. 8 shows an arrangement of stator windings applicable to all of the preceding schemes.

Let us suppose that for a variation $dN$ of the desired speed, the accelerating torque developed varies by the amount $dT$, and we shall arrange the connections as to obtain a negative value of the ratio $$\frac{dT}{dN}$$

no matter what the sign of $dN$ and no matter whether the metadyne operates as a motor or as a generator.

Figure 1 gives the scheme of a first arrangement accordingly to the present invention. The metadyne 1 has two sets of brushes, the primary brushes $a$ and $c$ are supposed to be connected to the series network or to the lines of the parallel network. A main field winding 2 is provided which creates an accelerating torque. The secondary brushes $b$ and $d$ are connected in series with two stator windings, the winding 3 and the winding 4. The former induces an electromotive force between the secondary brushes $b$ and $d$ having the same direction as the current traversing the winding 3. Therefore, at a given speed, a building up occurs that gives a large current in the secondary circuit formed by the secondary brushes, b and d, and the stator windings 3 and 4. This secondary current increases very much even for a slight increase of the speed, and traverses the stator winding 4 which then creates some ampere-turns opposing the ones created by the winding 2. Let us call N the speed for which an exact compensation of the ampere-turns of 2 and 4 is obtained. Then for a slight positive variation $dN$ of the speed N, (we mean a slight increase), we shall have a large variation of secondary current and therefore a large variation of braking torque, thus the torque variation $dT$ will be a large negative one. For a slight negative variation $dN$, (I mean a slight decrease), we shall have a large reduction of secondary current and thereby a large variation of accelerating torque, which means that $dT$ will be large and positive. Thus $$\frac{dT}{dN}$$

is always large and negative and the operation around the speed N will be a satisfactory one.

In Fig. 1 an arrow shows the relative direction of the armature ampere-turns created by the constant current I and of the ampere-turns created by the stator winding 3. These ampere-turns, far from compensating one another, act in the same direction, so that the building up of the current traversing the stator winding 3 will amplify the voltage induced between the secondary brushes b and d by the flux due to the armature ampere turns set up by the current I. As this is essential in all alternatives hereunder described, the said arrows have been repeated on Figures 3, 4, 5, 6, 7, 8 and 9.

To adjust the value of the operating speed, we have to adjust the electrical and magnetic constants of the secondary circuit in a manner well known to the man versed in the art. For instance we may adjust the total resistance of the circuit by a resistor 5 connected in series, or a resistor 6 connected in parallel, by varying the number of turns of the stator windings 3 and 4, said variator being diagrammatically shown in Fig. 1 by an arrow supposed to be capable of touching different turns at will, or by modifying the reluctance of the magnetic circuit, for instance by modifying the length of the air gap by a convenient adjustment of the pole core $m$ diagrammatically shown in Fig. 1 as capable of sliding in the yoke $n$.

On Figure 1 we have represented a metadyne with four brushes two primary and two secondary, but the man versed in the art may easily use any other number of brushes or any other relative position of these.

Figure 2 for instance shows a metadyne provided with only three brushes, two primary brushes a and c and only one secondary, the brush b. Figure 2 shows a simplification as compared with Figure 1; the two windings 3 and 4, the former necessary for the building up, and the latter necessary for developing the torque variations, are combined into only one indicated by 3 having its magnetic axis so inclined as to induce the right electromotive force between the brushes a and b which are part of the secondary circuit, and as to develop on the other hand a torque by its action upon the primary current in the right direction.

Figure 2 has a series main field winding, particularly suited in case the metadyne is inserted in a series network.

Figure 3 shows the scheme of another arrangement very similar to the arrangement of Figure 1 but where the windings 3 and 4, the former inducing the building up electromotive force between the secondary brushes, and the latter developing the torque variations, are connected in parallel with the secondary brushes.

Figure 4 shows the scheme of an alternative arrangement according to the present invention. The secondary brushes b and d of the metadyne 1 between which the electromotive force is built up at the operating speed, oppose through the torque developing winding 4, an auxiliary source 10 able to give an approximately constant voltage at the terminals 7 and 8. Let N be the value of the speed at which the building up takes place; for this value the electromotive force induced between the secondary brushes will balance exactly the voltage of the source 10, whatever this voltage may be, and no current will flow through the winding 4 and we will have no torque. Suppose now that the speed increases by $dN$ then the voltage induced between the secondary brushes will be the larger and an important current, because of the building up, made to traverse the winding 4 in such a direction as to develop a large braking torque. The reverse happens when the speed decreases; and this happens regardless of the actual value of the voltage of the auxiliary source 10 provided only its variations are not excessive. This is the reason why we may adopt as auxiliary source 10 a source of a voltage which is only approximately constant and may even vary, to some extent, with the speed. Thus the scheme of Figure 7, has been derived from the scheme of Figure 4, the auxiliary source being a small dynamo 10 driven by the metadyne 1 itself. In order to make the voltage variations of 10 as small as possible it will be useful to saturate its magnetic circuit for instance by cutting an opening o in the magnetic core $p$ as shown in Fig. 7. The said opening restricts the iron section whereby the core is saturated to a high degree. In the arrangement of Figures 4 and 7 the torque developed by the winding 4 may be positive or negative, the current traversing the primary brushes being supposed to have always the same direction; therefore, there is no more need of the winding 2 shown in the previous schemes. Fig. 9 gives a similar scheme, where the auxiliary source is a resistor 12 traversed by a current at constant intensity supplied by the source 9 illustrated as being a metadyne. Fig. 5 shows another alternative arrangement: In parallel with the secondary brushes b and d of the metadyne are connected two windings, the winding 3 which is needed for the building up of the voltage between the secondary brushes, and the winding 4 which is needed for the development of the torque. The three circuits:— the rotor circuit comprised between the secondary brushes, the winding 3 and the winding 4 share the current supplied by an auxiliary source 9 of direct current at constant strength. In the proximity of the building up speed N, great variations of current arise in the winding 4 for slight variations of speed, the current in 4 being able to flow in one or the other direction providing thus the motor with large variations of torque so as to maintain the speed practically constant. In the figure, the auxiliary source 9 has been shown to be a metadyne. This arrangement is particularly interesting when many metadyne motors have to operate simultaneously at values of speed independent from one another. Then we may use only one auxiliary source of direct current at constant strength, provided the rotor has two separate windings, one for the primary brushes and another for the secondary brushes as it is schematically shown in Fig. 6.

In all the above described schemes, we may amplify the variations of torque for a given variation of speed by adding a shunt stator winding connected across the primary brushes and including an electromotive force between the said brushes.

Figure 8 shows schematically the modification of the scheme of Figure 3 by the addition of the above-mentioned shunt winding 11.

Many modifications of the windings of the metadyne may be conceived by a man versed in the art, yet remaining within the scope of the present invention.

Having now particularly described and ascertained the nature of my said invention and in what manner the same is to be performed, I declare that what I claim is:

1. In an electrical motor of the metadyne type, having primary brushes for connection to a source of constant current and variable voltage, and secondary brushes, at substantially 90 electrical degrees from the primary brushes, means for causing the motor to rotate at a substantially constant speed, comprising stator windings, one of which is connected to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed, thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque.

2. In an electrical motor of the metadyne type, having primary brushes for connection to a source of constant current and variable voltage, and secondary brushes, at substantially 90 electrical degrees from the primary brushes, means for causing the motor to rotate at a substantially constant speed, comprising stator windings, one of which is connected to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed, thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque, the said other windings inducing an E. M. F. between the primary brushes and comprising a winding creating constant ampere-turns, and a winding connected to the secondary brushes.

3. In an electrical motor of the metadyne type, having primary brushes for connection to a source of constant current and variable voltage, and secondary brushes, at substantially 90 electrical degrees from the primary brushes, means for causing the motor to rotate at a substantially constant speed, comprising stator windings, one of which is connected in shunt connection to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque, the said other windings inducing an E. M. F. between the primary brushes and comprising a winding creating constant ampere-turns, and a winding connected in shunt connection to the secondary brushes.

4. In an electrical motor of the metadyne type, having primary brushes for connection to a source of constant current and variable voltage, and secondary brushes, at substantially 90 electrical degrees from the primary brushes, means for causing the motor to rotate at a substantial constant speed, comprising stator windings, one of which is connected in shunt connection to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed, thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque, the second stator winding inducing an E. M. F. between the primary brushes and connected in series with the secondary brushes and with an auxiliary dynamo supplying a substantially constant voltage to the secondary brushes and said secondary winding in series.

5. In an electrical motor of the metadyne type, having primary brushes for connection to a source of constant current and variable voltage, and secondary brushes, at substantially 90 electrical degrees from the primary brushes, means for causing the motor to rotate at a substantial constant speed, comprising stator windings, one of which is connected in shunt connection to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed, thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque, the second stator winding inducing an E. M. F. between the primary brushes and connected in series with the secondary brushes and with an auxiliary dynamo driven by the motor shaft, supplying a substantially constant voltage to the secondary brushes and said second winding in series.

6. In an electrical motor of the metadyne type, having primary brushes for connection to a source of constant current and variable voltage, and secondary brushes, at substantially 90 electrical degrees from the primary brushes, means for causing the motor to rotate at a substantially constant speed, comprising stator windings, one of which is connected in shunt connection to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed, thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque, the second stator winding inducing an E. M. F. between the primary brushes and connected also in shunt connection to the secondary brushes, and means for supplying constant current to the secondary brushes.

7. In an electrical motor of the metadyne type, having primary brushes for connection to a source of constant current and variable voltage, and secondary brushes, at substantially 90 electrical degrees from the primary brushes, means for causing the motor to rotate at a substantially constant speed, comprising stator windings, one of which is connected in shunt connection to the secondary brushes, inducing an E. M. F. between the secondary brushes in the same direction as the E. M. F. induced by the flux created by the armature ampere-turns, due to the constant current traversing the primary brushes, and adjusted to give rise to a building up at the secondary brushes at exactly the desired speed, thus producing in cooperation with the other stator windings a large variation of the flux, and therefore a large variation of the torque when the speed of the motor shows a slight discrepancy from the desired value, the direction of the torque tending always to bring the speed to the desired value and the speed remaining very closely at the same predetermined value even when the torque changes from full motoring torque to full braking torque, the second stator winding inducing an E. M. F. between the primary brushes and connected also in shunt connection to the secondary brushes, and a third stator winding creating constant ampere-turns and inducing an E. M .F. between the primary brushes, the fluxes produced by the second and third stator windings being in opposite directions.

JOSEPH MAXIMUS PESTARINI.